June 6, 1950 — J. L. SPEIER, JR — 2,510,149
CHLORINATION OF ORGANOSILICON COMPOSITIONS
Filed Feb. 10, 1947
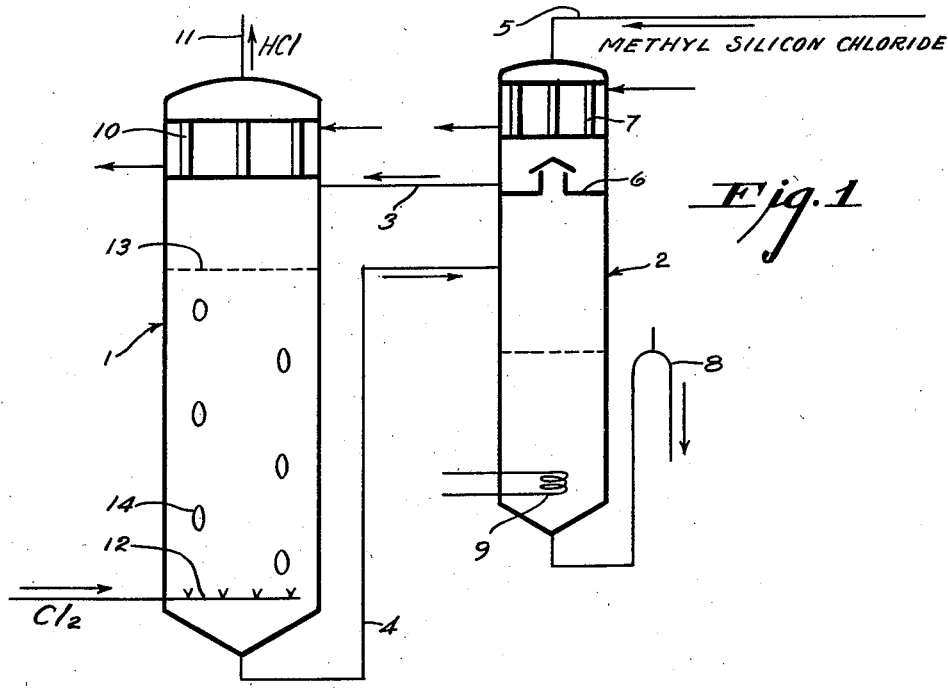
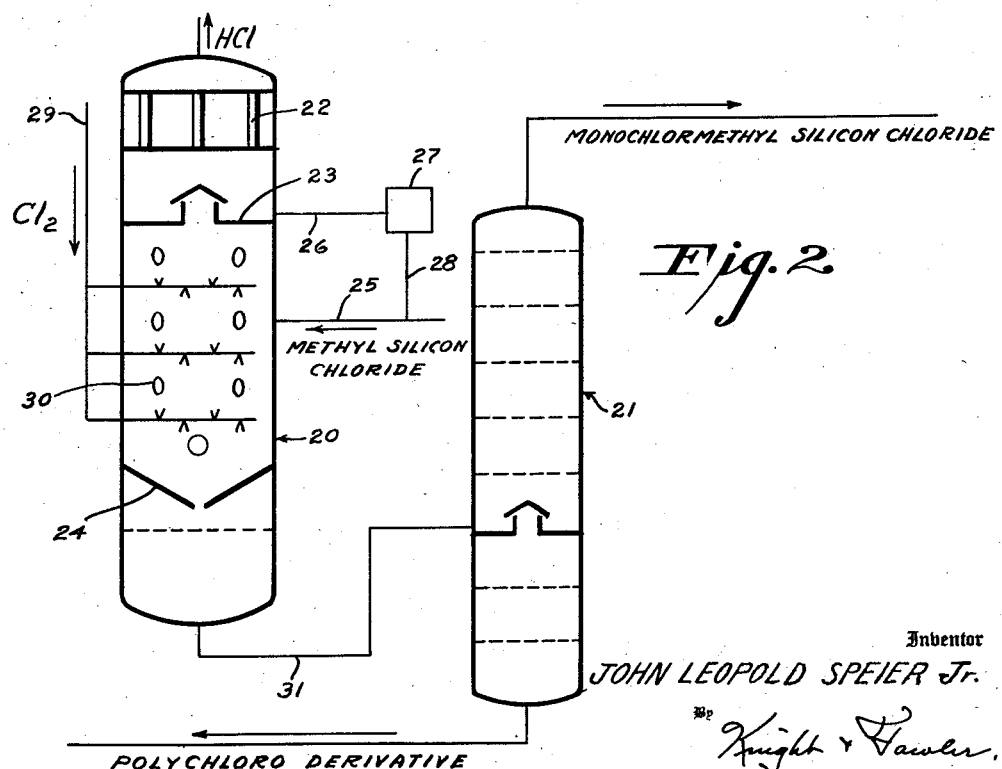
Inventor
JOHN LEOPOLD SPEIER Jr.
By Knight & Fawler
Attorneys Patented June 6, 1950

2,510,149

UNITED STATES PATENT OFFICE 2,510,149

CHLORINATION OF ORGANOSILICON COMPOSITIONS

John Leopold Speier, Jr., Pittsburgh, Pa., assignor to Corning Glass Works, Corning, N. Y., a corporation of New York Application February 10, 1947, Serial No. 727,630

2 Claims. (Cl. 260—448.2)

The present invention relates to the production of organosilicon materials which contain chlorine substituents in the organic radicals.

The chlorination of methyl silicon chlorides results in the formation of a series of products. For example, monochlormethyl silicon trichloride, $CH_2ClSiCl_3$, dichlormethyl silicon trichloride, $CHCl_2SiCl_3$, and trichlormethyl silicon trichloride, $CCl_3SiCl_3$ are formed in the chlorination of methyl silicon trichloride. The monochloro derivatives of the methyl silicon chlorides are the most desirable since the ease of fission of the carbon to silicon bond increases with increased chlorine substitution on any one carbon atom.

Objects of the present invention are to provide improved methods for the chlorination of methyl silicon chlorides, and to provide methods for the chlorination of methyl silicon chlorides in which the normal balance of chlorinated derivatives is shifted to give a high yield of the monochloro derivatives.

In accordance with the present invention, methyl silicon chloride is chlorinated by continually charging methyl silicon chloride into a reaction zone. Chlorine is also charged continually into the reaction zone, but at a feed rate relative to the feed rate of methyl silicon chloride sufficiently low to maintain methyl silicon chloride in the reaction zone continuously. This may be effected by feeding the chlorine in amount less than sufficient to form the monochloro derivative. Preferably less than 0.5 atom of chlorine per mol of methyl silicon chloride is fed into the reaction zone. Chlorinated methyl silicon chloride is continually removed from the reaction zone. The chlorinated product may be separated, if desired, from unreacted methyl silicon chloride. In case separation is effected, the separation may occur either in the reaction zone or in a separate zone from which methyl silicon chloride may be recycled to the reaction zone. By conducting the chlorination in accordance with the method stated, a remarkably high proportion of the monochloro derivative is obtained.

The process of the present invention may be conducted under widely varying conditions. Thus, the present process may be conducted as a liquid phase reaction, or it may be conducted in the vapor phase. The rate of the chlorination reaction may be accelerated by exposure of the reaction zone to light, preferably sunlight or any other source of high intensity light. A catalyst may be employed if desired.

The accompanying drawings are flow sheets which illustrate specific modes of operation of the process hereof. Fig. I is a flow sheet showing operation of the process hereof when conducted as a liquid phase reaction. Fig. II is a flow sheet showing operation of the process hereof when conducted as a vapor phase reaction.

In Fig. I, chlorinator 1 is connected to still 2 by line 3 to feed methyl silicon chloride from the still to the chlorinator, and by line 4 to feed chlorinated product from chlorinator 1 to still 2.

The still 2 is provided with an inlet 5 at its upper end for methyl silicon chloride. At a midpoint in the still there is a trap-out plate 6 to trap descending liquid phase methyl silicon chloride. In the zone of the still between inlet 5 and plate 6, there is provided a calandria 7, arranged with inlet and outlet connections, for cooling and condensing vaporized methyl silicon chloride.

Line 3 connects with the trap-out plate 6 of still 2 to remove liquid phase methyl silicon chloride therefrom for introduction into the chlorinator. Line 4 enters still 2 at a point below the trap-out plate 6 and above the level of liquid in the lower part of still 2.

Chlorinator 1 is a column which is provided in its upper end with a calandria 10 to condense any methyl silicon chloride vapors from hydrogen chloride which is formed in the chlorinator and which leaves by outlet 11 at the upper end of chlorinator 1. Calandria 10 is provided with suitable inlet and outlet connections for coolant. A chlorine diffuser 12 is positioned in the lower end of chlorinator 1. Between the chlorine diffuser 12 and liquid level 13 in the chlorinator suitable lights 14 are provided in the wall of the chlorinator to accelerate the reaction as indicated.

The lower end of chlorinator 1, at a point below the chlorine diffuser connects with line 4, whereby chlorinated product is removed from the chlorinator. The chlorinator 1 and the still 2 are positioned at such relative levels that the inlet of line 4 into still 2 is at the liquid level desired in the chlorinator. Line 3 communicates with the chlorinator to deliver methyl silicon chloride thereto at a point below calandria 10 and above liquid level 13.

In operation the temperature of the chlorinator 1 is maintained at below the boiling point of the methyl silicon chloride being chlorinated, the specific temperature depending upon the particular pressure employed. Temperature control of the chlorinator is effected primarily by control of heat exchange in calandria 7 and to a minor extent by control of heat exchange in calandria 10. The temperature in the base of still 2 is maintained at a temperature at or above the boiling point of the methyl silicon chloride at the pressure employed. The temperature likewise should be below the boiling point of the lowest boiling chlorinated derivative, namely of the monochloro derivative. No difficulty is encountered in obtaining a clean separation between the unreacted methyl silicon chlorides and their monochloro derivatives, since the boiling points differ substantially in each case.

While pressure has been referred to, positive pressure above atmospheric is not necessary for the present reaction. Atmospheric pressure is very suitable, and the reaction is quite rapid when suitable light or a catalyst is employed. However, if desired, positive pressure above atmospheric may be employed.

In the process as disclosed in Fig. II, the reactants are maintained in vapor phase in the chlorinator 20. The chlorinator communicates with a distillation column 21, which serves to separate the monochloro derivative from the small amount of bottoms which is obtained, and which is primarily polychloro derivative. The chlorinator 20 is provided with three zones. The top zone of the chlorinator is provided with a calandria 22 to condense methyl silicon chloride vapors rising in the chlorinator in mixture with hydrogen chloride. This top zone is separated from the reaction zone therebelow by a trap-out plate 23 for removing liquid phase methyl silicon chloride from the chlorinator. Spaced from the bottom of the chlorinator 20 there is positioned a plate 24, shaped to drain liquid from the reaction zone into the collector section of the chlorinator therebelow. An inlet 25 for methyl silicon chloride communicates with the reaction zone of the chlorinator 20 between the plates 23 and 24. The exact position of the inlet 25 is unimportant. A drain 26 from trap-out plate 23 is provided to remove liquid phase methyl silicon chloride. If desired, this liquid phase methyl silicon chloride may be recycled through vaporizer 27 and line 28 to the inlet line 25. Chlorine may be introduced by diffuser 29 into the reaction zone. Preferably the diffuser 29 is arranged to introduce the chlorine at a multitude of points dispersed throughout the reaction zone in order to prevent high local concentrations of chlorine. Suitable lights 30 are provided in the wall of the reaction zone of the chlorinator 20.

Fractionator 21 is of conventional construction. Line 31 communicates from the lower end of the chlorinator to a midpoint in the fractionator. The level of the inlet into the fractionator is arranged to provide a body of fluid in the base of the chlorinator in order to prevent vapor phase communication of the chlorinator and the fractionating column.

In operation, the feed of methyl silicon chloride is sufficient to maintain an atmosphere of the silane in the reaction zone. The chlorine which is introduced thereinto reacts rapidly therewith. While it would be possible to balance the operation and maintain the feed of methyl silicon chloride just sufficient that no more is introduced than is adequate to provide a continuous atmosphere thereof, in the reaction zone, the most efficacious manner of commercial operation involves feeding an excess thereof to chlorinator 20, whereby a portion of the methyl silicon chloride is condensed in calandria 22 and recycled through lines 26, 28 and 25.

The reaction zone is maintained at a temperature between the boiling point of the methyl silicon chloride and of the monochloro derivative of the methyl silicon chloride. Accordingly, upon the chlorination of any portion of the methyl silicon chloride, the chlorinated derivative will immediately condense and drop to plate 24 at the lower end of the chlorination zone and then drain into the body of liquid in the lower end of the chlorinator 20. The chlorinated product then flows from the body of liquid into the fractionator in which the monochloro derivative is separated from the polychloro derivatives.

These monochloromethyl compositions are of utility in the production of siloxanes. Thus, monochlormethyl silicon trichloride is of utility in the formation of high polymers containing chlorinated methyl silsesquioxane structural units. Formerly it was possible to obtain such polymers only by the chlorination of polymers containing methyl silsesquioxane structural units. This is unsatisfactory, if any extensive chlorination is desired, since a preferential chlorination of some of the methyl radicals occurs, which in turn results in the loss of the organic substituents which are chlorinated. By the hydrolysis of the monochloro derivative of methyl silicon trichloride, or the cohydrolysis of mixtures of silanes containing the monochloro derivative, polymers may be prepared containing monochloro substituted methyl silsesquioxane structural units at definite points throughout the polymer structure.

EXAMPLES

Example 1

A monochloromethyl silicon chloride was prepared by feeding trimethyl silicon chloride into the top of a reaction zone. Chlorine gas was fed into the reaction zone countercurrent to the flow of trimethyl silicon chloride. The chlorine was fed at such a rate that less than 0.5 atom of chlorine was added per mol of trimethyl silicon chloride. The product was continually removed from the zone and fed into a stripping zone. The stripping zone was maintained at atmospheric pressure and at a temperature sufficient to distill off the unreacted trimethyl silicon chloride, which boils at 59° C., and insufficient to distill off the monochlormethyl dimethyl silicon chloride. The temperature range between these two is about 55° C. The trimethyl silicon chloride distillate was condensed and returned to the reaction zone. A distillation analysis of the bottoms products obtained from the stripping zone is as follows:

| Product | Per Cent by Volume |
|---|---|
| $(CH_3)_3SiCl$ | 34.0 |
| $CH_2Cl(CH_3)_2SiCl$ | 50.5 |
| Bottoms | 15.5 |
| Total | 100.0 |

Example 2

Dimethyl silicon dichloride was fed into the top of a reaction zone, and chlorine gas was fed into the reaction zone countercurrent to the flow of dimethyl silicon dichloride. The chlorine was fed at such a rate that less than 0.5 atom of chlorine was added per mol of dimethyl silicon dichloride. The product was continually removed from the zone and fed into the stripping zone. The stripping zone was maintained at atmospheric pressure and at a temperature sufficient to distill off the unreacted dimethyl silicon dichloride, which boils at 70° C., and insufficient to distill off the monochlormethyl methyl silicon dichloride. The temperature range between these two is about 52° C. The dimethyl silicon dichloride distillate was condensed and returned to the reaction zone. A distillation analysis of the bottoms products obtained from the stripping zone is as follows:

| Product | Per Cent by Volume |
|---|---|
| $(CH_3)_2SiCl_2$ | 35.0 |
| $CH_2ClCH_3SiCl_2$ | 42.0 |
| Bottoms | 23.0 |
| Total | 100.0 |

*Example 3*

Methyl silicon trichloride was fed into the top of a reaction zone, the chlorine gas was fed into the reaction zone countercurrent to the flow of methyl silicon trichloride. The chlorine was fed at such a rate that less than 0.5 atom of chlorine was added per mol of methyl silicon trichloride. The product was continually removed from the zone and fed into the stripping zone. The stripping zone was maintained at atmospheric pressure and at a temperature sufficient to distill off the unreacted methyl silicon trichloride, which boils at 68° C., and insufficient to distill off the monochlormethyl silicon trichloride. The temperature range between these two is about 50° C. The methyl silicon trichloride distillate was condensed and returned to the reaction zone. A distillation analysis of the bottoms products obtained from the stripping zone is as follows:

| Product | Per Cent by Volume |
|---|---|
| $CH_3SiCl_3$ | 44.0 |
| $CH_2ClSiCl_3$ | 22.0 |
| Bottoms | 34.0 |
| Total | 100.0 |

That which is claimed is:

1. The method of preparing monochlormethyl silicon chlorides which comprises continually charging methyl silicon chloride into a reaction zone, maintaining the rate of charging chlorine relative to the rate of charging methyl silicon chloride sufficiently low that methyl silicon chloride is maintained in the reaction zone continuously, whereby the methyl silicon chloride is chlorinated, maintaining the temperature of the reaction zone between the boiling points of the methyl silicon chloride and of the monochloro derivative, whereby the monochloro derivative condenses upon formation, and continually removing chlorinated methyl silicon from the reaction zone whereby predominately the monochloro derivative is formed.

2. The method of preparing monochlormethyl silicon chlorides which comprises continually charging methyl silicon chloride into a reaction zone, continually charging chlorine into said reaction zone in amount less than sufficient to form the monochloro derivative of the methyl silicon chloride, whereby methyl silicon chloride is maintained in the reaction zone continuously and whereby the methyl silicon chloride is chlorinated, maintaining the temperature of the reaction zone between the boiling points of the methyl silicon chloride and of the monochloro derivative, whereby the monochloro derivative condenses upon formation, withdrawing unreacted methyl silicon chloride from the reaction zone, and separately continually removing chlorinated methyl silicon chloride from the reaction zone.

JOHN LEOPOLD SPEIER, JR.

REFERENCES CITED

The following references are of record in the file of this patent:

UNITED STATES PATENTS

| Number | Name | Date |
|---|---|---|
| 1,623,018 | Cross | Mar. 29, 1927 |
| 2,342,072 | Bailey | Feb. 15, 1944 |
| 2,384,384 | McGregor | Sept. 4, 1945 |

OTHER REFERENCES

Krieble, "Jour. Amer. Chem. Soc.," vol. 67 (1945), pages 1810–1812.

Whitmore, "Jour. Amer. Chem. Soc.," vol. 68 (1946), pages 481–484.

Hurd, "Jour. Amer. Chem. Soc.," vol. 67 (1945), pages 1813–1814.

Groggins, "Unit Processes in Organic Synthesis," 2nd edition (1933), pages 224, 225.

Sommer, "Jour. Amer. Chem. Soc.," vol. 68 (1946), pages 485–487.